Patented July 11, 1944

2,353,367

UNITED STATES PATENT OFFICE 2,353,367

2-AMINO-4-OXO-5-ETHOXY-PENTENE-(2) AND PROCESS FOR THE MANUFACTURE OF SAME

Otto Schnider, Basel, Switzerland, assignor to Hoffmann-La Roche Inc., Nutley, N. J., a corporation of New Jersey No Drawing. Application September 5, 1941, Serial No. 409,749. In Switzerland September 25, 1940

4 Claims. (Cl. 260—584)

If ammonia is caused to act on acetyl-acetone, 2-amino-4-oxo-pentene-(2) is obtained (Bulletin de la Société Chimique de France [3] 7, page 779). During this process it cannot be decided which CO group takes part in the reaction as in each case the same final product is bound to result. In the case of ethoxy-acetyl-acetone, however, there are two possibilities as regards the action of ammonia. Either 2-amino-4-oxo-5-ethoxy-pentene-(2) or 2-oxo-4-amino-5-ethoxy-pentene-(3) or both simultaneously may result.

It has now been found that during the reaction of ethoxy-acetyl-acetone with ammonia surprisingly only 2-amino-4-oxo-5-ethoxy-pentene-(2) is obtained under the most varied conditions. Instead of ethoxy-acetyl-acetone, the alkali salts of this compound can also be used. In this case ammonia must be replaced by an ammonium salt.

The course of the reaction just described is of considerable practical importance. The hitherto unknown 2-amino-4-oxo-5-ethoxy-pentene-(2) condenses readily with malonitrile to yield a pyridine derivative which is an important intermediate for the synthesis of vitamin $B_6$. At the same time this condensation is a proof of the constitution of the compound obtained in accordance with the process described.

2-amino-4-oxo-5-ethoxy-pentene-(2) is a slightly colored yellow oil which is easily soluble in water and in the usual solvents. It boils at 119–122° C. under a pressure of 12 mm. and is an intermediate in the manufacture of medicinal preparations.

Example 1

144 parts by weight of ethoxy-acetyl-acetone are dissolved in 300 parts by weight of methanol and a stream of dry ammonia gas introduced without cooling. The ammonium salt of ethoxy-acetyl-acetone first precipitating is converted into 2-amino-4-oxo-5-ethoxy-pentene-(2) which is easily soluble in methanol, with separation of water. The introduction of ammonia is continued until 20 parts by weight of ammonia have been taken up. After standing for 12 hours, excess ammonia as well as methanol are evaporated and the residue distilled in vacuo. 2-amino-4-oxo-5-ethoxy-pentene-(2) is isolated as a slightly yellowish oil between 119 and 122° C. under a pressure of 12 mm.

Example 2

144 parts by weight of ethoxy-acetyl-acetone are added drop by drop to 200 parts by weight of aqueous 10% ammonia while stirring. The said compound goes into solution in the form of the ammonium salt. The product is now heated for 1 hour to 45–50° C. The reaction has then come to an end. The 2-amino-4-oxo-5-ethoxy-pentene-(2) formed remains in solution. It can be extracted therefrom by means of solvents which are not miscible with water, such as benzene or chloroform, and purified by distillation in vacuo.

Example 3

166 parts by weight of the crude sodium salt of ethoxy-acetyl-acetone, prepared in accordance with the directions given by Sommelet (Bulletin da la Société Chimique de France [4], page 382), are dissolved in 350 parts by weight of water. To this solution 55 parts by weight of ammonium chloride are added while stirring and the mixture heated to about 45–50° C. The 2-amino-4-oxo-5-ethoxy-pentene-(2) formed separates as an oil. After stirring for 2 hours the compound is taken up in benzene and purified after evaporation of the benzene by distillation in vacuo.

I claim:

1. 2-amino-4-oxo-5-ethoxy-pentene-(2).
2. Process for the manufacture of 2-amino-4-oxo-5-ethoxy-pentene-(2), comprising the step of reacting ammonia with ethoxy-acetyl-acetone.
3. Process for the manufacture of 2-amino-4-oxo-5-ethoxy-pentene-(2), comprising the step of reacting an ammonium salt with an alkali salt of ethoxy-acetyl-acetone.
4. Process for the manufacture of 2-amino-4-oxo-5-ethoxy-pentene-(2), comprising the step of reacting ammonium chloride with the sodium salt of ethoxy-acetyl-acetone.

OTTO SCHNIDER.